July 21, 1970  W. J. DAHLMAN ET AL  3,521,023

PLASMA TORCH

Filed July 3, 1968  2 Sheets-Sheet 1

INVENTORS
WILLIAM J. DAHLMAN
LEE F. BUDDS
BY Thomas S. MacDonald
ATTORNEY

United States Patent Office

3,521,023
Patented July 21, 1970

3,521,023
PLASMA TORCH
William J. Dahlman, Sylmar, and Lee F. Budds, Canoga Park, Calif., assignors to North American Rockwell Corporation, a corporation of Delaware
Filed July 3, 1968, Ser. No. 742,311
Int. Cl. B23k 9/16
U.S. Cl. 219—75                                                 5 Claims

ABSTRACT OF THE DISCLOSURE

A miniature plasma torch having fingertip controls and switch means in the torch handle to control the arc current and to operate said torch in either a transferred or non-transferred mode to perform a variety of welding, cutting and soldering operations at the working site as opposed to the conventional method of controlling the torch at a remote location distant from the workpiece site.

BACKGROUND OF THE INVENTION

Conventional plasma torches, well-known in the art, normally are controlled from a remote location distant from the torch itself. Cables containing the electrical wires and the tubing for the inert gas lead from a control module to the torch with no means to control the torch from the working end. An obvious disadvantage of this type of torch is that the controls are located distant from the operator which sometimes necessitates an additional man to operate the control variables. This type of operation is inefficient and time consuming. In addition, if the operator wants to change the arc on this torch to perform a different function, other than what he had been working with, he must again readjust the parameters on the torch at the remote location, therefore, the operator cannot change from one mode to a different mode without going back again to the control module.

State of the art plasma torches operate in the transferred mode only; i.e., the arc is established between the electrode and the grounded workpiece. The non-transferred mode; i.e., arcing between the electrode and the grounded torch, is used only to initially start the torch whereupon it immediately transfers to the workpiece during operation. This prior art type of torch cannot utilize the non-transferred mode during operation which lends itself to other types of torch operations such as cutting, brazing and soldering.

When an inert gas is used to purge the workpiece prior to welding with prior torches, the purge gas is brought in through a separate line. The cold purge gas can cause minute fissures or "crater cracking" in the weld and surrounding areas.

Conventional plasma torches are further disadvantaged in that they must be "scratch-started"; i.e., the electrode comes in contact with the ground in the torch and backed away after start. This causes excessive burning of the tungsten electrode.

It is an object of this invention to provide a miniature plasma torch which incorporates all of the controls in the torch handle which are necessary to change the operating variables so that the operator can make minute adjustments as the situation arises at the workpiece site itself.

SUMMARY OF THE INVENTION

The invention comprises a hand operated miniature plasma torch of the type which arcs through an electrode, thereby ionizing a surrounding inert gas such as argon to perform various welding and cutting operations. The controls, normally located at a remote location, are mounted within the torch housing, thus enabling the operator to make any adjustment on the hand torch as is necessary without going back to the controls on the torch control module. The controls comprise a combination on-off switch and current control rheostat regulator as well as a second switch to transfer the electrical ground from the torch to the workpiece, i.e., from a non-transfer mode to the transferred mode and back to the non-transfer mode as required.

In accordance with a preferred embodiment of the invention, an advantage over the prior art is realized in that the miniature torch containing all of the control variables within the torch itself obviates the necessity of a second operator at the controls which are located remotely from the torch operator. The torch operator may change the variables on the torch itself without relying on the judgement of a second operator at the remote control panel thus a better welding or cutting operation can be realized because of the instant ability to make minute torch adjustments as conditions change.

The operator can switch from a transferred mode to a non-transferred mode and back to a transferred mode at will, merely by manipulating a button on the torch. The non-transferred mode can be used for a variety of torch operations. For example, the torch can be used for light welding, brazing or soldering by setting the parameters on the torch to suit conditions. Prior art plasma torches operate in the transferred mode only. Once contact with the workpiece is broken, the torch must be started again while the instant invention automatically reverts back to the transferred mode when contact is broken with the workpiece.

Further, the operator, at will, and depending upon the heating requirements of each particular operation, may fingertip dial the required settings utilizing the current control rheostat mounted in the torch housing. In this manner either a decrease or increase in current may be selected as required, or a continuous setting may be maintained for any given length of time while the plasma arc is operating.

The inert gas used to purge the workpiece prior to welding is heated in the miniature torch itself, thereby obviating the possibility of "crater cracking" or fissures that are caused by the addition of cold inert gas of the prior art torches. The present invention locates the electrode a set distance from the ground for a non-transferred start utilizing high frequency voltage which obviates the necessity of "scratch starts," thereby preventing excessive burning of the tungsten electrode. The electrode is not moved after starting the torch in the non-transferred mode.

Water cooling as opposed to air cooling is utilized during operation. Conventional torches are air cooled, requiring multiple fins for heat dissipation, thus the torch is relatively large and cumbersome.

DESCRIPTION OF THE DRAWINGS

The above noted objects and further advantages of the instant invention will be more fully understood upon the study of the following detailed description in conjunction with the detailed drawings in which.

Figure 1:
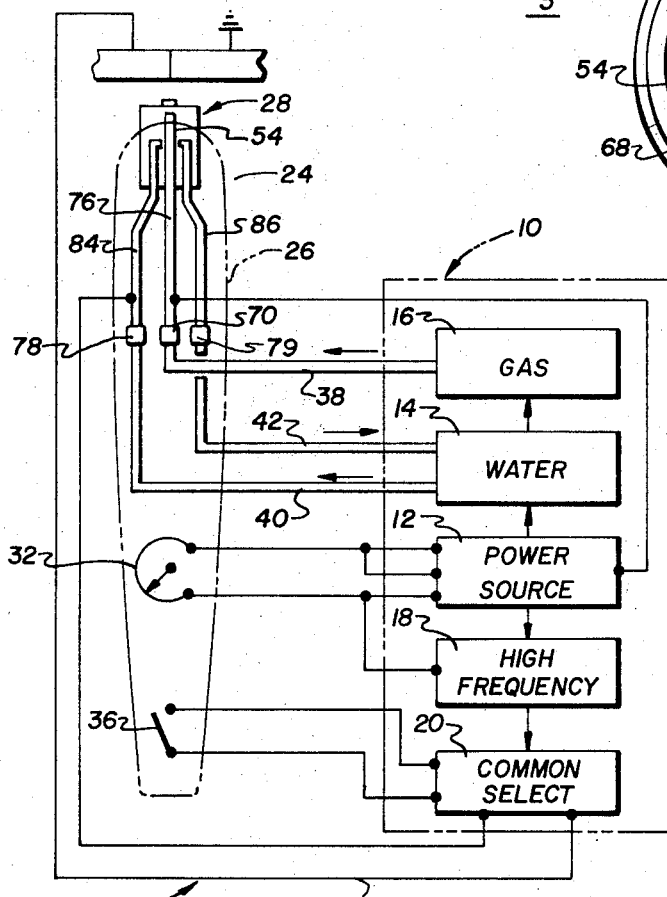
FIG. 1 is a schematic of the electrical circuit utilized to operate the plasma torch.

Referring to FIG. 1, a schematic diagram illustrates the miniature plasma torch system. The module generally designated as 10 is flexibly connected to torch 24 by a length of multiple tube conduit 22. Module 10 contains a power source 12, high frequency start circuitry 18, transfer, non-transfer select circuitry 20, as well as the water supply 14 and an inert gas supply 16, all of which are initiated at torch 24. The torch 24 consists of housing 26 having affixed thereto a water jacketed torch head 28, variable rheostat 32 and the transfer, non-transfer switch 36.

In operation, the module 10 is switched on at the workpiece site by rheostat 32 affixed to torch 24. The rheostat is dialed to the desired setting which triggers the following sequence of events at module 10. Circulating water 14 and inert gas 16 starts first, utilizing solenoid valves and a conventional timing system (not shown) which allows water and gas to flow a set time prior to initiation of the high frequency start system 18. The high frequency system creates an arc between the electrode 54 and the torch head 28, thereby ionizing the surrounding inert gas. Immediately after start, the high frequency system automatically is switched off and the torch 24 is ready for use. A high frequency circuit as suggested in Marks' Mechanical Engineers' Handbook, pp. 13–34, second paragraph, may be employed. To transfer the arc from the torch 24 to the workpiece 29, the transfer, non-transfer switch 36 is depressed which breaks the ground between the electrode 54 and the torch head 28 and transfers it to the workpiece 29. When the torch is moved away from the workpiece, the arc automatically reverts back to a non-transfer mode. A simple circuit utilizing a latching relay and a voltage sensor is employed in module 10. When the arc voltage increases to a set value, the latching relay is re-engaged thereby automatically transferring the ground to the torch (non-transferred mode). To transfer the arc back to the workpiece 29, the operator again depresses switch 36.

Figure 2:
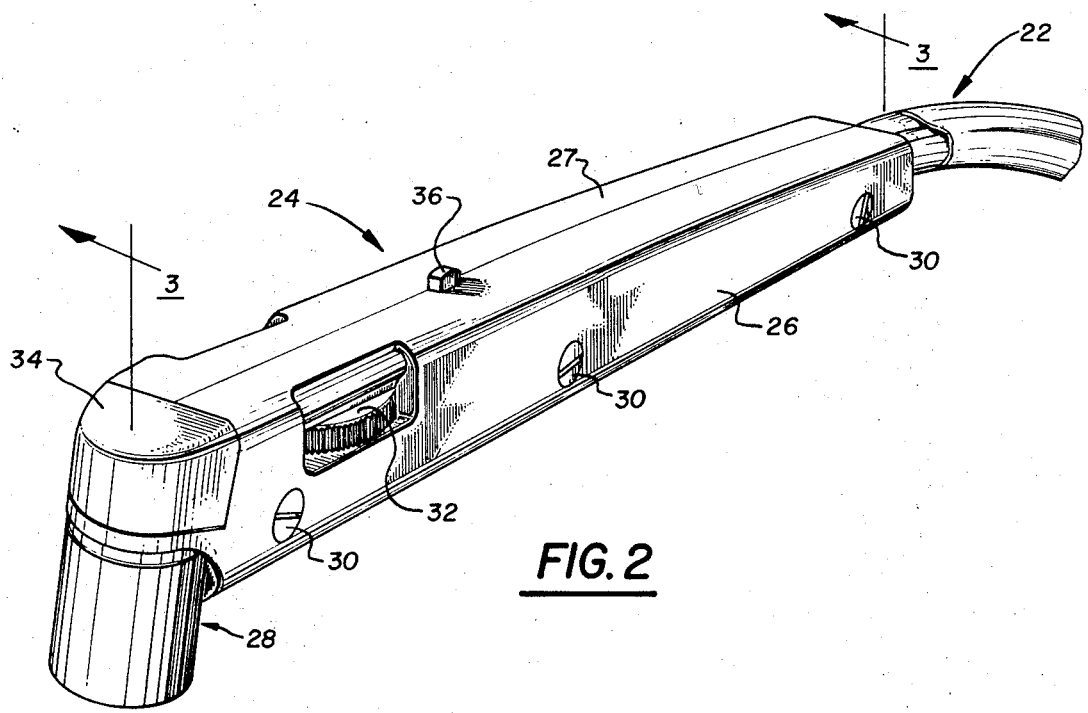
FIG. 2 is a perspective view of the overall plasma torch illustrating the various control functions.
Figure 3:
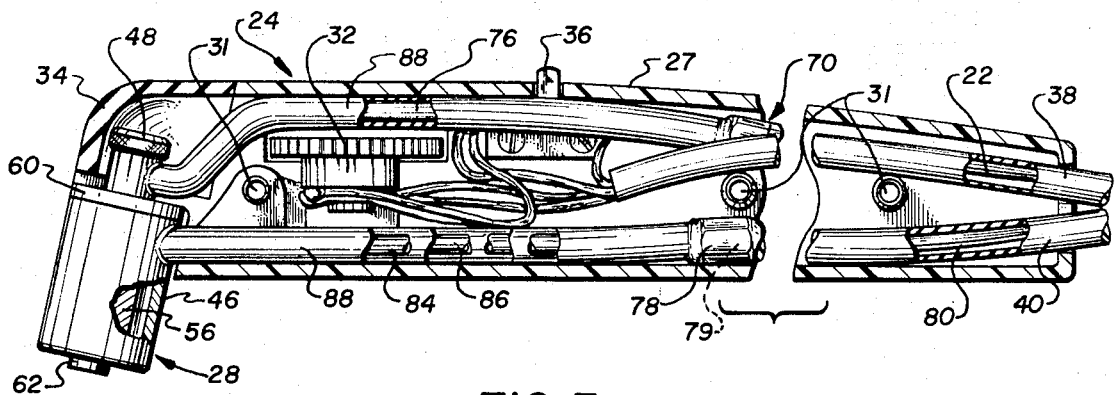
FIG. 3 is a side partial cutaway elevational view of the torch showing the physical locations of all the control functions.

FIG. 2 is a perspective view of torch 24 which best illustrates the location of rheostat 32 and transfer button 36 which threadably attached to mounts integral with half shell 26. The torch is fully operational by one hand. The operator has the capability to fingertip dial the optimum setting for the torch dependent upon the job requirements. The torch 24 comprises two half shells 26, 27 preferably of reinforced plastic which retain torch head 28 by screws 30 mated to female bosses 31 located in half shell 27 (FIG. 3). Rheostat 32 and transfer switch 36 are affixed to half shell 27. Rubber cap 34 protects the electrically "hot" retaining cap 48 shown in FIG. 3.

Figure 4:
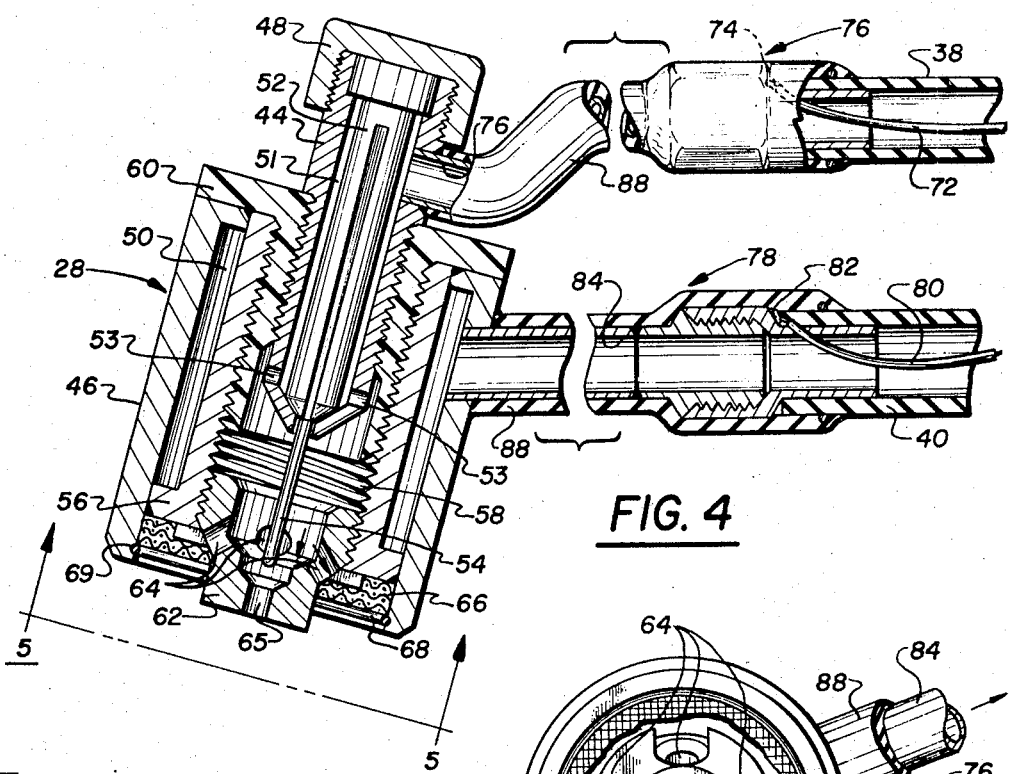
FIG. 4 is a section taken through the torch head illustrating the location of the electrode in relation to the gas passages, etc.

With reference to FIGS. 3 and 4, torch head 28 is brazed to metal inert gas inlet 76 and water conduits inlet and outlet 84 and 86 which serve as structural support members for torch 24. The metal tubing is routed around rheostat 32 and switch 36 terminating at connectors 70, 78 and 79 located towards the rear handle of torch 24. The metal lines are electrically isolated from wires and components in the torch body by protective sleeves 88. The conductive metal conduits 76, 84 and 86 serve an additional function. Hot wire 72 from power source 12 is routed internally of rubber inert gas conduit 38 and is soldered to connector 70 whereupon conduit 76 carries the current to the electrode housing 44. The inert gas passing over wire 72 serves to cool the wire. Ground wire 80 from the transfer, non-transfer circuit 20, is routed through rubber water conduit 40 and soldered to connector 78 which converts metal water conduit 84 to ground, terminating at water jacket 46. The ground wire is cooled similarly to hot wire 72.

FIG. 4 is a detail of torch head 28. Retaining cap 48, electrode housing 44, sleeve 52 and the tungsten electrode 54 are electrically isolated from the water jacket housing 46 by Teflon insulator 60. Inner sleeve 56 is threadably engaged with insulator 60 and is welded to outer housing 46, the space therebetween defining circulating water chamber 50. Plasma arc injector button 62 serves as a ground for electrode 54 in the non-transfer condition and is threadably engaged with liner 56. Button 62 is interchangeable with alternate buttons having various central orifice sizes 65.

Figure 5:
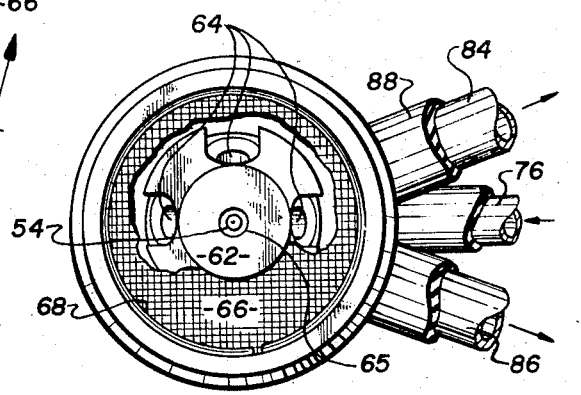
FIG. 5 is a view taken along lines 5—5 of FIG. 3 illustrating the gas lens and the location of the existing purge orifices.

FIG. 5 is a bottom view of FIG. 4 which more clearly shows gas lens 66, retaining ring 68, button 62 and the relationship of water inlet and outlet lines 84 and 86.

The torch 24 operates as follows: prior to ignition, water is circulated down conduits 40 and 84 from water source 14 around chamber 50 and back to water source 14 through water return lines 86 and 42. At the same time, purge gas from source 16 is routed through conduit 38 and 76 into upper inert gas chamber 51 through ports 53 into a chamber 58 and out through ports 64 and 65 in button 62. Part of the inert gas flow is diffused through gas lens 66. The gas lens is retained by spring ring clip 68 which is biased against annular groove 69 in housing 46. After a timed interval, the high frequency circuit 18 initiates an arc starting the torch and then turns off. The adjustable tungsten electrode 54 is set to about 0.070" between the tip of the electrode and button 62 which is close enough for the high frequency system to create the arc thereby obviating the necessity of a "scratch start." Some of the pre-heated inert gas passes out of the chamber 58 through ports 64 and is diffused through gas lens 66 onto the workpiece.

The power source 12 normally has a capacity of 50 amps which allows the torch to be used in a variety of different ways. The torch flames have a range from 200° F., up from 24,000° F., merely by dialing the rheostat 32 to a desired setting. Thus, the operator has the capability ranging from welding solder to cutting high strength steels. Therefore, the miniature torch is highly versatile.

It is obvious that changes and modifications can be made in the above described embodiments without departing from this invention, it being understood that the scope of the invention is to be limited only by the appended claims.

We claim:
1. A plasma torch adapted to be hand held comprising:
an electrode,
torch head means forming an ionizing chamber about said electrode,
means forming a plasma jet exit from said chamber,
a source of inert gas,
conduit means extending from said source to said chamber, said conduit means including a conductive portion attached to said torch head means,
a power source connected to said conductive portion, said portion being in electrical contact with said electrode,
a housing forming a torch handle enclosing said conductive portion and abutting said torch head means,
first switch means within said housing adjacent said conductive portion to control and proportion vary current flow to said electrode,
a first operator extending from said first switch means through a wall of said housing and being manually manipulatable to actuate said switch means,
second switch means within said housing to operate said torch alternatively in a transferred mode or a non-transferred mode, said second switch means being operably connected with means to create an arc between said electrode and said torch head means in said non-transferred mode in a first position of said second switch means and being operably connected with means to transfer the arc between said electrode and a juxtaposed workpiece in said transferred mode in a second position of said second switch means, and
a second operator extending from said second switch means through a wall of said housing and being manually manipulatable to actuate said second switch means.

2. The invention of claim 1 wherein said housing has means forming at least one aperture in a wall of said housing, said first operator being of disc-like shape and extending radially outwardly through said aperture,
means forming a second aperture in a wall of said housing, said second operator means extending outwardly through said second aperture.

3. The invention of claim 1 wherein said first switch means is a rheostat and said first operator is a revolving disc extending radially from said housing.

4. The invention as set forth in claim 1 including means operably connected to said second switch means to automatically change the arc from a transferred mode to a non-transferred mode when said electrode is moved away from the workpiece whereby an increase in arc voltage to a set value transfers a ground connection from said workpiece back to said torch head means to maintain said arc within said plasma torch.

5. The invention as set forth in claim 4 in which said means automatically charging the arc includes a latching relay which is reengaged to transfer the ground connection at said set value.

References Cited

UNITED STATES PATENTS

| | | | |
|---|---|---|---|
| 2,425,183 | 8/1947 | Hall | 219—132 |
| 2,484,959 | 10/1949 | Redekopp | 219—132 |
| 2,765,144 | 10/1956 | Layden | 219—75 |
| 2,798,145 | 7/1957 | Vogel | 219—75 |
| 2,799,769 | 7/1957 | Vogel | 219—75 |
| 2,872,566 | 2/1959 | Leppala | 219—132 |
| 3,174,027 | 3/1965 | Manz | 219—131 |
| 3,309,492 | 3/1967 | Fields | 219—75 |
| 3,413,436 | 11/1968 | Tallman | 219—75 |

JOSEPH V. TRUHE, Primary Examiner

W. D. BROOKS, Assistant Examiner

U.S. Cl. X.R.

219—130